July 25, 1933.  C. DE GANAHL  1,919,620
MONOSPAR AIRPLANE
Filed Feb. 26, 1931  2 Sheets-Sheet 1
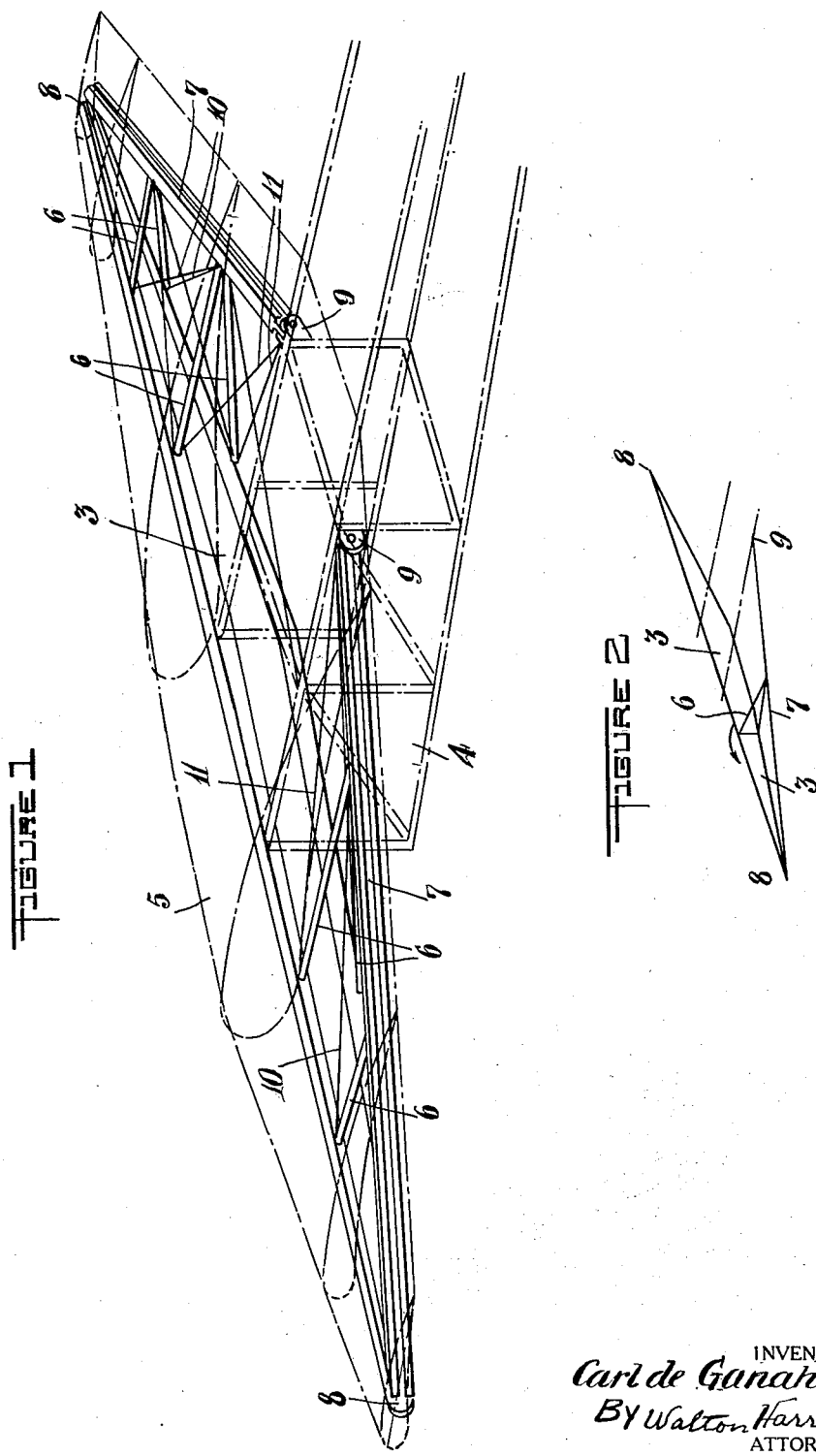
INVENTOR
Carl de Ganahl
By Walton Harrison
ATTORNEY July 25, 1933.    C. DE GANAHL    1,919,620
MONOSPAR AIRPLANE
Filed Feb. 26, 1931    2 Sheets-Sheet 2
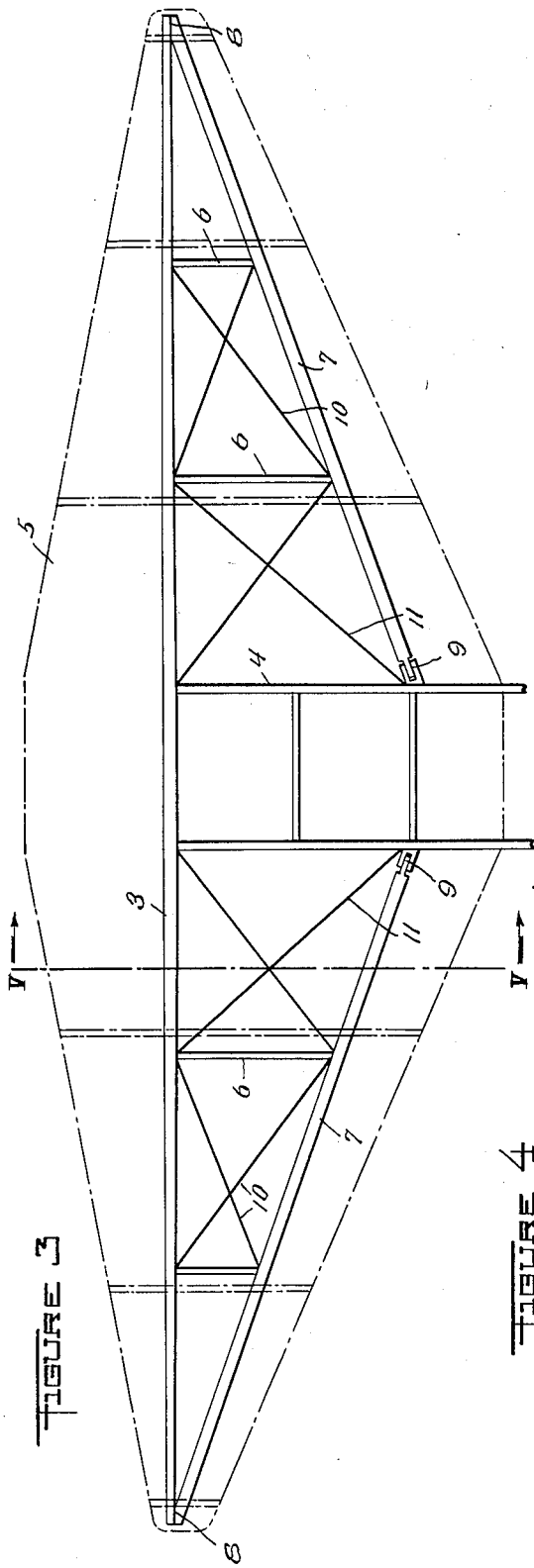
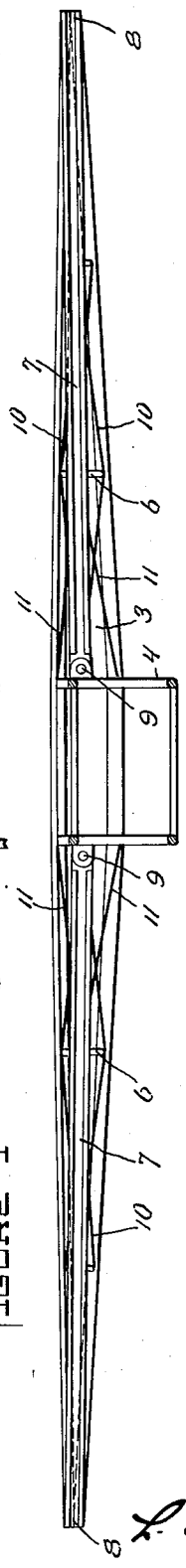
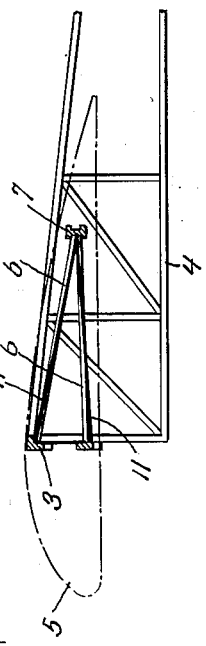
INVENTOR
Carl de Ganahl
his ATTORNEY Patented July 25, 1933

1,919,620

UNITED STATES PATENT OFFICE

CARL DE GANAHL, OF GREENLAWN, NEW YORK, ASSIGNOR TO FLEETWINGS, INC., OF GARDEN CITY, LONG ISLAND, NEW YORK, A CORPORATION OF DELAWARE

MONOSPAR AIRPLANE

Application filed February 26, 1931. Serial No. 518,319.

My invention relates to airplanes in which a single spar is used to carry the entire wing load, the spar being located along the span of the wing at the center of lift of the wing, whose profile or contour is such that the center of lift does not vary with changing attitude of flight but remains practically constant on a straight line along the span of said wing.

More particularly stated, I seek a method of bracing the above type of monospar wing against any twisting or torsion loads that may appear due to aileron action, wing flutter or the small amount of center of lift movement still remaining.

These torsional stresses have heretofore in great measure discouraged the use of monospar airplanes, the result being that at the present time practically all airplanes are of the bispar type; that is, provided with two spars, designated respectively as the front or main spar and the rear spar.

In the conventional manner of assembling an airplane wing, where the two spars are used in conjunction with a wing section in which there is a shifting of the center of wing lift back and forth within limits relatively wide, it necessarily follows that the load is partially and wholly shifted fore and aft from one spar to the other, as the attitude of flight is varied from moment to moment.

Since, however, the two spars carry at best only the one load, and since there are conditions of flight under which either spar must carry all of the load, it is clear that the two spars are necessary in order to do that which a single spar could accomplish alone, provided that single spar could be effectively maintained at all times directly over the center of pressure, thus avoiding undue torsion of the wing.

These observations are specially pertinent in the case of a cantilever tapered wing. In such a wing the rear spar can not be a straight spar strictly parallel with the front spar, due to the shortness of the tip chord as compared with the root chord. On this account the rear spar must be provided with a bend at or near the fuselage and must extend diagonally forward, approximately parallel with the trailing edge of the wing. A load on the tip of such a spar must inherently cause a twist in the wing, at the point where the spar is bent. Therefore excessive bracing is required at this point, and even with adequate bracing the removal of all flexibility is almost impossible. The result is that the rear spar is rendered very heavy, and yet is not stiff enough to properly carry its load.

At comparatively recent dates there have been developed wing sections in which the shifting movements of the center of wing lift have been kept relatively small, and yet no plane using only a single spar construction has come into practical use.

This is due principally to difficulties in bracing. It is no easy matter to brace a single spar against air drag, or against the torsion set up in the wing by action of the ailerons, or against even a relatively small shifting movement of the center of pressure, or against ordinary wing flutter.

The purpose of my invention is to provide a novel system of bracing to overcome all of these difficulties.

I use a single spar, and on this spar I use a wing section with a relatively small center-of-pressure movement, and so locate the wing relatively to the spar that the center of wing lift is maintained practically along the center line of the spar. By this arrangement the torsional stresses to which the wing is subjected are very materially reduced, and thus is avoided all necessity for a heavy rear spar.

By my system of bracing I take care of the reduced torsional stresses still remaining together with aileron loads, ordinary wing flutter, and backward drag due to forward flight.

I provide a pair of stiff light rails, pin jointed at one end to the fuselage and at the other to the adjacent tip of the single spar. These rails are designed to take care of compression due to drag, and of bending loads applied by the ailerons, together with the small amount of torsion still remaining, and wing flutter.

Reference is made to the accompanying drawings forming a part of this specification, and in which like reference characters indicate like parts throughout all of the figures.

Figure 1 is a fragmentary perspective of a monospar airplane provided with my invention.

Figure 2 is a diagram illustrating the manner in which my invention tends to take care of any torsional stresses still remaining in the wing when used as above described.

Figure 3 is a top plan view of the structure illustrated in Figure 1.

Figure 4 is a rear edge view of the structure as shown in Figure 3, parts of the fuselage being shown in vertical section, and Figure 5 is a vertical sectional view taken substantially upon the plane of line V—V of Figure 3.

A single straight spar is shown at 3, and is mounted upon the fuselage 4. The spar may be of any appropriate design, but is preferably a cantilever spar or may be a braced spar. It must be capable of carrying the entire load of the airplane, under maximum load conditions. It must possess a certain amount of tensile strength in the direction of its length, but, according to my invention, it is not particularly required to withstand drag or horizontal wind pressure. It has considerable width vertically and is, therefore, stiff in a vertical direction, but it has relatively less width horizontally and has, therefore, less strength against horizontal pressure than against vertical pressure.

Mounted upon the spar 3 is a tapered wing 5, so located and having an airfoil section of such form that the center of wing lift has a minimum of movement, the spar extending along the aforesaid central line demarking the proximate center of wing lift.

In this connection any desired taper of wing can be used, since the sharpness of the taper of the wing relatively to the fuselage is no longer a problem.

For a given span of wing, the greater the taper of the wing the nearer the entire load is brought to the center of the airplane; and as no appreciable aerodynamic loss in efficiency is noted up to the point where the taper is about five to one, a taper of four to five to one is preferable.

With the parts above mentioned arranged as described the additional bracing needed is, first, that which is required to overcome drag or wind pressure tending to force the wing backward or forward in the horizontal plane of travel, and second, such as is necessary to prevent the wind lift from twisting the wing, due to movement of the ailerons, wing flutter, and the small amount of center of lift movement still present.

I will now describe the mechanism by which I attain the additional bracing thus required.

Mounted upon the spar 3 and spaced apart are two or more V-braces 6, 6, extending rearwardly and of different lengths, commensurate with the wing taper. There are two sets of these braces, located upon opposite sides of the fuselage.

A pair of straight, relatively light, but stiff, rails 7, 7, extend from the tips of the spar, as at 8, 8, inwardly to the fuselage as at 9, 9, being firmly fixed by their ends to the spar and to the fuselage spaced rearwardly of the spar. Each of the rails 7 is constructed to receive and to withstand compression strains in the direction of its length, and also to receive and to withstand lateral bending strain applied intermediate its ends, and it is not intended to bend under these strains.

The V braces 6, 6, have their apexes connected with the rails 7, 7, and have their opposite legs diverging and extending to and being connected with the top and bottom chords respectively of the spar 3, each V brace, with its connections, forming a triangle between the spar and one of the rails, the base of the triangle being fixed to the spar and the apex to the rail.

The several triangles thus formed between the spar and the rails are spaced apart at suitable intervals along length of the spar and rails, and thus along the span of the wing.

As a means of further bracing the framework I provide a number of tension wires 10, 11, arranged in pairs, each pair being secured to the two chords of the spar, at the open or forward ends of the V-braces, and thence extending diagonally backward to and converging at the rail 7.

The tension wires are essentially tie rods, and they are so positioned as to assist in sustaining the various stresses.

With this construction and arrangement any tendency of the wing to twist is converted into a vertical load on the rails 7, 7, and these rails transmit this load as vertical pressure partly to the adjacent tip of the spar and partly to the fuselage.

This distribution of the stresses prevents the development of a twist in the wing.

The theory of my invention may be understood from an examination of the diagram shown in Figure 2.

A study of this diagram will make it plain that any force tending to rotate the spar in the direction indicated by the arrow, or in other words acting as if to turn the triangle in a counter-clockwise direction according to Figure 2, is transmitted by the V-brace 6 and applied as an up load tending to lift the rail 7 by its middle. The rail 7, being stiff, the load is divided and transmitted as an up load applied partly to the fuselage and partly to the tip 8 of the single spar.

The many advantages of a successful and practicable substitution of a single spar for the two spars heretofore conventionally used are very great, and are too obvious to require further comment.

I do not limit myself to the precise mechanism here illustrated and described, nor to the use of a cantilever spar or to a braced spar of any kind, the scope of my invention being commensurate with my claims.

Having thus described my invention, what I claim as new and desire to secure by Letters Patent is as follows:—

1. An airplane formed with a fuselage and having rigid non-camber-varying wings, said wings including a single spar extending across and being fixed to the fuselage, and bracing means for said spar, said spar having top and bottom cords spaced apart vertically at the fuselage but converging towards the opposite ends of the spar, said spar being constructed to support the maximum load of the fuselage in a vertical direction but being of appreciably less horizontal width and strength, and said bracing means comprising a pair of rails designed to withstand endwise compression and vertical bending strains, said rails being secured by their inner ends to opposite sides of the fuselage at points rearwardly of the spar and extending in opposite directions from the fuselage substantially to the opposite ends respectively of the spar and being fixed by their outer ends to the spar so as to receive endwise compression from the spar.

2. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, and a plurality of V-braces spaced apart along the length of the spar intermediate the spar and said rail and being connected by their apexes with said rail and by the top and bottom portions of their larger ends with the top and bottom cords respectively of the spar.

3. An airplane formed with a fuselage and having a rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, a plurality of V-braces spaced apart along the length of the spar intermediate the spar and said rail and being connected by their apexes with said rail and by the top and bottom portions of their larger ends with the top and bottom cords respectively of the spar, and a plurality of tension wires co-acting with said V-braces and extending diagonally between and fixed to the spar and said rail.

4. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, and means fixed to and extending between said spar and said rail intermediate their length utilizing the non-bending quality of the rail to brace said spar against torsional movement.

5. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, a plurality of spaced compression braces extending between and fixed to the spar and said rail, and a plurality of tension braces interspersed among the compression braces and coacting therewith, each tension brace also extending between and fixed to the spar and said rail.

6. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, a plurality of compression V-braces spaced apart along the length of the spar intermediate the spar and said rail and being connected by their apexes with said rail and by the top and bottom portions of their larger ends with the top and bottom cords respectively of the spar, and a plurality of tension wires coacting with said V-braces and extending diagonally between the spar and said rail being fixed each to the spar adjacent one compression V-brace and to the rail adjacent another compression V-brace.

7. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail designed to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, a plurality of rigid compression V-braces spaced apart along the length of the spar intermediate the spar and said rail and being connected by their apexes with said rail and by the top and bottom portions of their larger ends with the top and bottom cords respectively of the spar, and a plurality of tension V-braces co-acting with said compression V-braces and extending between the spar and said rail being fixed by their apexes with said rail and by the top and bottom portions of their larger ends with the top and bottom cords respectively of the spar.

8. An airplane formed with a fuselage and having rigid non-camber-varying wings, said wings including a spar extending lengthwise of the wing, and bracing means for said spar, said spar having top and bottom cords spaced apart vertically at the fuselage and fixed to the fuselage but converging toward the outer end of the spar, said spar being constructed to support the maximum load on the wing in a vertical direction but being of appreciably less width and strength, and said bracing means comprising a rail design to withstand endwise compression and vertical bending strains, said rail being secured at its inner end to the fuselage at a point rearwardly of the spar and extending outwardly from the fuselage substantially to the outer end of the spar and being there fixed to the spar so as to receive endwise compression from the spar, a plurality of rigid compression V-braces spaced apart along the length of the spar intermediate the spar and said rail and being connected by their apexes with said rail and by the top and bottom portions of their larger ends with the top and bottom cords respectively of the spar, and a plurality of tension V-braces coacting with said compression V-braces and extending between the spar and said rail being fixed by their apexes with said rail adjacent one compression V-brace and by the top and bottom portions of their larger ends with the top and bottom cords respectively of the spar adjacent another compression V-brace.

9. In an airplane having opposite wings, said wings being non-camber-varying and including a single wing spar extending from tip to tip of said opposite wings, said spar having top and bottom cords spaced apart vertically at the mid portion of the length of the spar but converging to the opposite ends of the spar, said spar being constructed to support the load in a vertical direction but being incapable by itself of withstanding strains to which it may be subjected in use tending to bend the end portions of the spar horizontally, and bracing means for said spar co-operative therewith to render the wings non-camber-varying comprising a pair of rails constructed to withstand without bending all endwise and lateral bending strains to which they may be subjected in use, said rails being secured by their inner ends to points of anchorage spaced horizontally away from the mid portion of the spar and extending from said points of anchorage outwardly in converging relation to the spar and being fixed by their outer ends to the outer end portions of the spar to receive endwise strains from the spar.

10. In an airplane having opposite wings, said wings being non-camber-varying and including a single wing spar extending from tip to tip of said opposite wings, said spar having top and bottom cords spaced apart vertically at the mid portion of the length of the spar but converging at the opposite ends of the spar, said spar being constructed to support the load in a vertical direction but being incapable by itself of withstanding strains to which it may be subjected in use tending either to distort it in a torsional direction or to bend its end portions horizontally, and bracing means for said spar co-operative therewith to render the wings non-camber-varying comprising a pair of rails constructed to withstand without bending any endwise and lateral bending strains to which they may be subjected in use, said rails being secured by their inner ends to points of anchorage spaced horizontally away from the mid portion of the spar and extending from said points of anchorage outwardly in converging relation to the spar and being fixed by their outer ends to the outer end portions of the spar to receive endwise strains from the spar, together with means fixed to and extending between the spar and said rails intermediate the length of said rails utilizing the non-bending quality of the rails to brace the spar against said torsional strains.

11. In an airplane having opposite wings, said wings being non-camber-varying and including a single wing spar extending from tip to tip of said opposite wings, said spar having top and bottom cords spaced apart vertically at the mid portion of the length of the spar but converging to the opposite ends of the spar, said spar being constructed to support the load in a vertical direction but being incapable by itself of withstanding strains to which it may be subjected in use tending either to distort it in a torsional direction or to bend its end portions horizontally, and bracing means for said spar co-operative therewith to render the wings non-camber-varying comprising a pair of rails constructed to withstand without bending all endwise and lateral bending strains to which they may be subjected in use, said rails being secured by their inner ends to points of anchorage spaced horizontally away from the mid-portion of the spar and extending from said points of anchorage outwardly in converging relation to the spar and being fixed by their outer ends to the outer end portions of the spar to receive endwise strains from the spar, together with a plurality of stiff V-braces extending between the spar and said rails spaced apart along the length of the spar, said V-braces being fixed by their apexes to the rails and each having its opposite legs fixed to the top and bottom cords respectively of the spar, whereby to utilize the non-bending quality of the rails to brace the spar against torsional movement.

CARL DE GANAHL.